Dec. 1, 1942. A. P. SULLIVAN 2,303,589

FLUID PUMP

Original Filed March 15, 1940

INVENTOR
ALAN P. SULLIVAN
BY
Edmund G. Borden
ATTORNEY

Patented Dec. 1, 1942

2,303,589

UNITED STATES PATENT OFFICE 2,303,589

FLUID PUMP

Alan P. Sullivan, Elizabeth, N. J., assignor to Cities Service Oil Company, New York, N. Y., a corporation of Pennsylvania Original application March 15, 1940, Serial No. 324,178. Divided and this application July 2, 1941, Serial No. 400,765

1 Claim. (Cl. 103—7)

This invention relates to fluid pumps and more particularly to pumps of the rotary positive displacement type. The invention was originally described in my copending application Serial No. 324,178, filed March 15, 1940, for "Fluid pumps," of which this is a division which application has now resulted in Patent No. 2,280,271, April 21, 1942.

The invention concerns improvements in proportional mixing pumps whereby a mixture of predetermined proportions is obtained without varying the supply pressures of the fluid portions entering the pump. The invention further relates to improvements in proportional mixing pumps whereby the proportions of the mixture can be varied in definite predetermined ratio by switching the fluid supply connections to spaced pump intake ports.

The discharge flow from a rotary pump operated at a constant speed will vary directly with any change in the pressure of the fluid entering the pump. This fact introduces a problem in several applications of rotary pumps where a constant volume discharge of fluid is desired and the fluid to be pumped is available only at variable pressures. When the variations in pressure are at a contsant rate and do not fluctuate rapidly, this disability has been overcome in some instances by the use of manual controls, such as changing the speed of the pump or changing the chamber volume of the pump to compensate for the variations in the suction pressure of the fluid. Nevertheless, if the fluid suction pressure fluctuates rapidly, it is evident that manual controls are unsatisfactory for obtaining a constant volume discharge.

It is an object of this invention, therefore, to provide a means for automatically adjusting any variations in the suction pressure of a fluid entering a rotary pump to a fixed pressure, in order that the volume discharge from the pump will be constant.

Another object of this invention is to provide a means for automatically adjusting any variations in the supply pressure of either one of several fluids entering a proportional mixing pump to a constant pressure, such that the mixture discharged from the mixing pump will have constant proportions of each fluid.

A further object of this invention is to provide a means for varying the proportions of the fluids mixed in two different predetermined ratios.

These and other objects not specifically enumerated will be apparent from the description of the invention in connection with the accompanying drawing.

The preferred form of constant volume discharge pump for the invention is a circular rotary positive displacement pump with four blades. In the operation of the pump, fluid is drawn into the suction port of the pump, its pressure is adjusted at a pressure regulating port to a predetermined constant pressure, it is then compressed, and a constant volume flow of the fluid is released at a discharge port.

Figure 1:
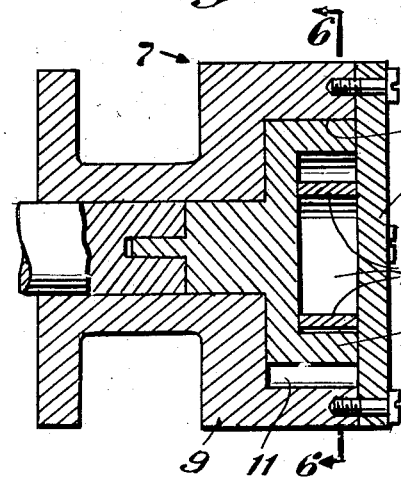
Fig. 1 is a sectional view of the preferred form of the constant volume discharge pump taken through the center of the pump along the line 5—5 of Fig. 2.
Figure 2:
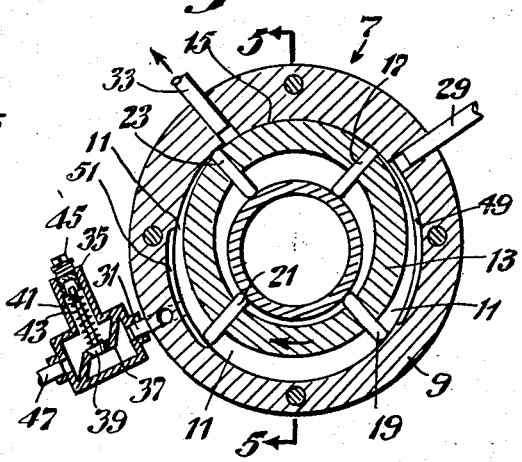
Fig. 2 is a sectional view taken through the chamber of the pump along line 6—6 of Fig. 1.

Referring to Figs. 1 and 2, a constant volume discharge pump 7 comprises a housing 9 having a circular chamber or bore 11 located therein, eccentric with respect to the outer walls of said housing 9. A rotary piston or rotor 13 having four radial slots, is eccentrically mounted in chamber 11 so as to contact the wall of chamber 11 at point 15. In the four slots of rotor 13 are placed blades 17, 19, 21, and 23 which blades slide and reciprocate in slots of rotor 13 as the rotor turns. Although four blades are shown in this preferred form of the invention, the pump will operate with somewhat similar effect with two or more blades. A stationary blade guide ring 25 extends within rotor 13 touching the inside edge of each blade for the purpose of keeping the blades pressed against the walls of chamber 11 to wipe the walls as the rotor 13 turns. The movable parts of the pump are held in housing 9 by means of an end plate 27.

The pump 7 has a lunate working chamber between the periphery of the piston and the walls of the bore into which open suction port 29, a pressure regulating port 31, and a discharge port 33. An adjustable exhaust valve 35 is connected to pressure regulating port 31 to maintain a predetermined pressure at the port. Exhaust valve 35 has a seat 37 in which fits valve disk 39 having a stem 41 attached thereto. A spring 43 wound around stem 41, holds disk 39 pressed against seat 37. The pressure that disk 39 exerts against seat 37 can be varied by an adjustable nut 45.

A groove 49 cut in the wall of chamber 11 is connected to suction port 29 for the purpose of extending the period of suction of the blades passing port 29. Each blade will draw fluid into the pump through suction port 29 while the blade moves throughout the length of the groove 49.

Another groove, 51, cut in the wall of chamber 11 is connected to port 31 in order to extend the time of pressure adjustment of fluid in the pump 7 as the fluid passes pressure regulating port 31. Fluid held between successive blades will have its pressure adjusted to the pressure maintained at port 31 until the rear of the two successive blades reaches the end of groove 51.

In the operation of pump 7, the rotor 13 turns in a clockwise direction, and as the blade 17 moves downward the chamber space between blades 17 and 19 increases its volume, drawing fluid into the pump through suction port 29 until blade 17 reaches the end of groove 49. When blade 17 reaches the position of blade 19 in Fig. 2, the volume of the space between blades 17 and 19 is at a maximum. The location of the end of groove 49 is at a point through which blade 17 has just passed prior to its reaching the position of blade 19 in Fig. 2. When blade 19 reaches the position of blade 21 (Fig. 2), the fluid in the spaces between blades 17 and 19 begins to be adjusted to the pressure of port 31. The adjustment of the fluid pressure continues until blade 17 reaches the end of groove 51. The fluid is then compressed, and discharged through port 33.

The pressure to be maintained at regulating port 31 depends upon the minimum pressure at which the fluid enters suction port 29. The pressure at exhaust valve 35 should be adjusted such that when the pressure of the fluid at suction port 29 is at a minimum, there will be a slight amount of fluid exhausted through opening 47 of exhaust valve 35.

When fluid enters suction port 29 at such a low pressure that a positive pressure does not exist at port 31, groove 51 should be extended toward discharge port 33 for a sufficient distance to permit compression in the space between two blades to develop a positive pressure at port 31 and to permit a slight amount of fluid to be discharged through opening 47. The end of groove 51 is thus located by operating the pump with a fluid of the lowest suction pressure to be encountered and extending groove 51 until a positive pressure is maintained at port 31.

Groove 51 connected to port 31 should start at a point such that when the space between two successive blades is at a maximum volume the forward blade will just be past the beginning of the groove.

In pumps having more or less than four blades the position where the groove should start is located at a point on the housing more than X number of degrees past the point of maximum clearance between the rotor and the housing, the value for X being determined from the ratio of $$\frac{180°}{\text{number of blades}}$$

For example, in a pump having four blades the groove starts at a point 45° past the point of maximum clearance between the rotor and the housing; and in a pump having six blades the groove starts at a point 30° past the point of maximum clearance.

When operating the pump then there will always be a constant flow of fluid from discharge port 33 even though there are variations in the supply pressure of the fluid entering the pump at suction port 29, as the pressure of the fluid is adjusted to a predetermined pressure at the pressure adjusting port 31 before the fluid is compressed.

In a proportional mixing pump of the rotary positive displacement type, the amount of each fluid drawn into the pump is determined by the location of the suction ports with respect to the periphery of the pump chamber and by the supply pressure of the fluid entering the pump. In many applications for mixing pumps, the supply pressure of one of the fluids entering the pump is variable, thus causing the proportions of the mixture to vary. By the use of the constant volume discharge pump previously described in combination with a proportional mixing pump, mixtures of constant proportions are obtained even though the supply pressure of one of the fluids at the intake port of the constant volume discharge pump is variable.

Figure 3:
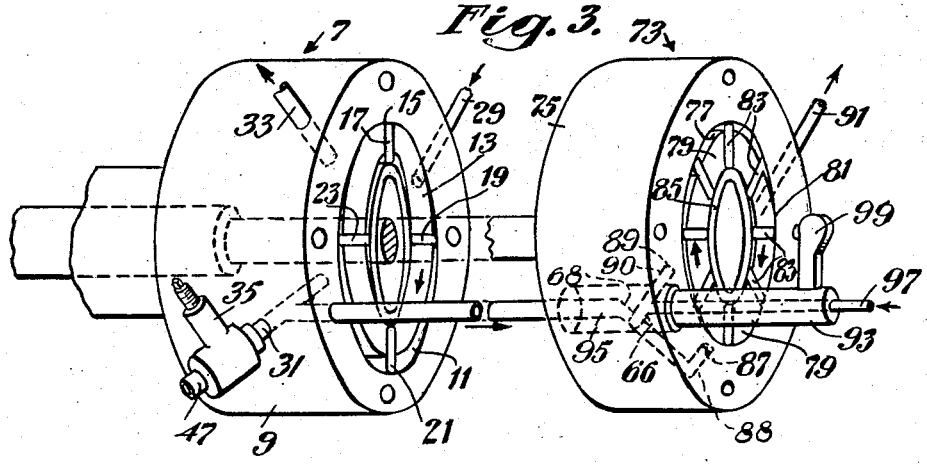
Fig. 3 is a perspective view of the constant volume discharge pump in combination with a variable proportional mixing pump.

Fig. 3 illustrates the combination, with a proportional mixing pump 73 at the right and constant discharge pump 7 at the left. In Fig. 3 the pumps are illustrated as being separated, but when these pumps are assembled, the shafts of their rotors are keyed to each other and their housings fit together, such that the housing of mixing pump 73 serves as an end plate for constant discharge pump 7.

Variable mixing pump 73 comprises a housing 75 having a chamber or bore 77 eccentrically located therein with respect to the outer surface of housing 75. A rotor or piston 79 is eccentrically mounted in chamber 77, which rotor touches the wall of chamber 77 at a point 81 and forms a lunate working chamber between its periphery and the walls of the bore 77. There are eight uniformly spaced radial slots in rotor 79, in which blades 83 are placed. A blade guide ring 85 touching the edges of blades 83, holds them against the wall of chamber 77.

There are two suction ports, 87 and 89, and one discharge port 91 in the pump. The location of the ports 87 and 89 with respect to the periphery of chamber 77 will determine the amount of each fluid entering the pump 73. Rotor 79 of pump 73 turns in a clockwise direction. Suction ports 87 and 89 are spaced from each other a distance greater than the distance between the outer ends of adjacent rotor blades 83, port 89 being located nearer to the discharge port but on the suction side of the pump. As chamber space 84 between any pair of adjacent blades 83 moves successively past ports 87 and 89 it gradually increases in volume, drawing fluids into the pump first through suction port 87 and then through suction port 89. The location of the suction ports of pump 73 has been designed to draw in one volume of fluid from a constant pressure supply source at port 89 when five volumes of a second fluid from a constant pressure supply source are drawn in at port 87.

A proportioning valve 93 has a cylindrical rotor in which are two axial passages or fluid supply conduits 95 and 97, the valve rotor being journaled in a cylindrical bore which forms a seat for the valve in housing 75. Suction ports 87 and 89 communicate respectively with fluid supply passages 88 and 90 leading up to the seat of valve 93, the openings 60 and 62 of such passages into the seat being spaced 90° apart on the periphery of said seat. As shown in Figs. 3-6, conduit 97 is connected to two wall ports 64 and 66 spaced 180° apart on the periphery of the valve, and conduit 95 is connected to a wall port 68 in the periphery of the valve at a point spaced 90° from each of ports 64 and 66. All of ports 64, 66 and 68 are rotatably aligned with openings 60 and 62 so that each of conduits 95 and 97 will be connected respectively to one or the other of suction ports 87 and 89 at different settings of the valve.

Figure 4:
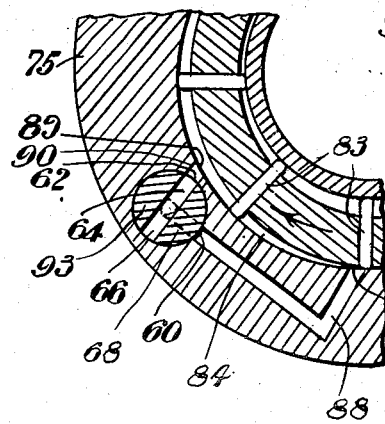
Fig. 4 is an enlarged cross-sectional view of a portion of the mixing pump housing within which the proportioning valve is journaled.
Figure 5:
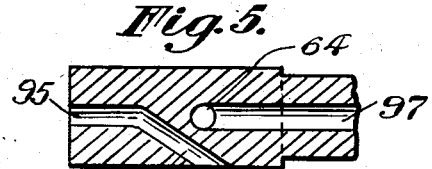
Fig. 5 is an enlarged longitudinal section of a part of the proportioning valve.
Figure 6:
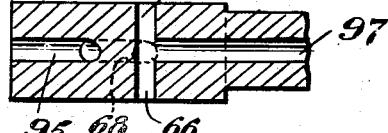
Fig. 6 is another longitudinal section through the valve of Fig. 5 taken on a plane at right angles to the section of Fig. 5.

There are two positions for valve 93; the position shown in Figs. 3 and 4 and a position 90° counterclockwise from the position illustrated. When valve 93 is in the position illustrated in Figs. 3 and 4, five volumes of fluid (for example combustible gas) are drawn from a source of supply at constant pressure (for example atmospheric) into suction port 87 from conduit 95 through passages 68 and 88 while one volume of a second fluid (for example air) is drawn from a source of constant pressure supply (for example from atmosphere) into suction port 89 through conduit 97 and port 64 and passage 90. When valve 93 is turned 90° counterclockwise from the position illustrated, five volumes of the second fluid will be drawn into suction port 87 from conduit 97 through port 66 and passage 68 when one volume of the first fluid is drawn into suction port 89 from conduit 95 through passages 68 and 90.

When the pumps 7 and 73 are assembled and operating, fluid A enters pump 7 at suction port 29, has its pressure adjusted at pressure regulating port 31 and is discharged at a constant rate through port 33. With valve 93 in the position illustrated, part of fluid A at relief port 31 is conveyed through valve conduit 95 to suction port 87, and fluid B is drawn in at suction port 89 by way of valve conduit 97. The two fluids are mixed and compressed in the ratio of five parts fluid A to one of the fluid B. The valve 93 may be manually turned by lever 99. If valve 93 is turned 90° counterclockwise from the position illustrated, one volume of fluid A will enter suction port 89 and five volumes of fluid B will enter suction port 87.

Relief valve 35 should be adjusted for settings of valve 93 in order to have a slight discharge through opening 47 when fluid A is at the lowest pressure at which it will be when entering suction port 29.

The preferred form of the invention along with combinations of the invention thus being described, what is claimed as new is:

In a rotary piston pump, a housing with a bore, a rotary cylindrical piston mounted eccentrically within said bore and dimensioned to provide a lunate chamber between its periphery and the walls of the bore, a plurality of spaced radial slots in said piston and blades mounted therein for reciprocal movement with their outer ends in constant wiping contact with the walls of the bore, fluid suction and discharge ports in the housing opening respectively into the chamber adjacent opposite ends thereof, and a second suction port opening into the pumping chamber at a point between and spaced from the first suction and discharge ports at the suction end of the chamber, together with a proportioning valve comprising a tubular housing with a cylindrical rotor journaled therein, passages communicably connecting the two suction ports of said pump respectively with two ports in the housing of said valve, said valve housing ports having a peripheral spacing of 90° valve angle, a pair of connected oppositely disposed wall ports in said valve rotor both rotatably aligned with said valve housing ports, said paired ports having a communicable connection with a source of fluid supply, and a third wall port in said valve rotor at a point spaced 90° valve angle from each of said paired valve ports and also rotatably aligned with said valve housing ports, said third port having a communicable connection with a second fluid supply source.

ALAN P. SULLIVAN.